Sept. 10, 1940.  F. L. FREEMAN  2,213,981
VEHICLE DRIVE MECHANISM
Original Filed Jan. 21, 1938  5 Sheets-Sheet 1
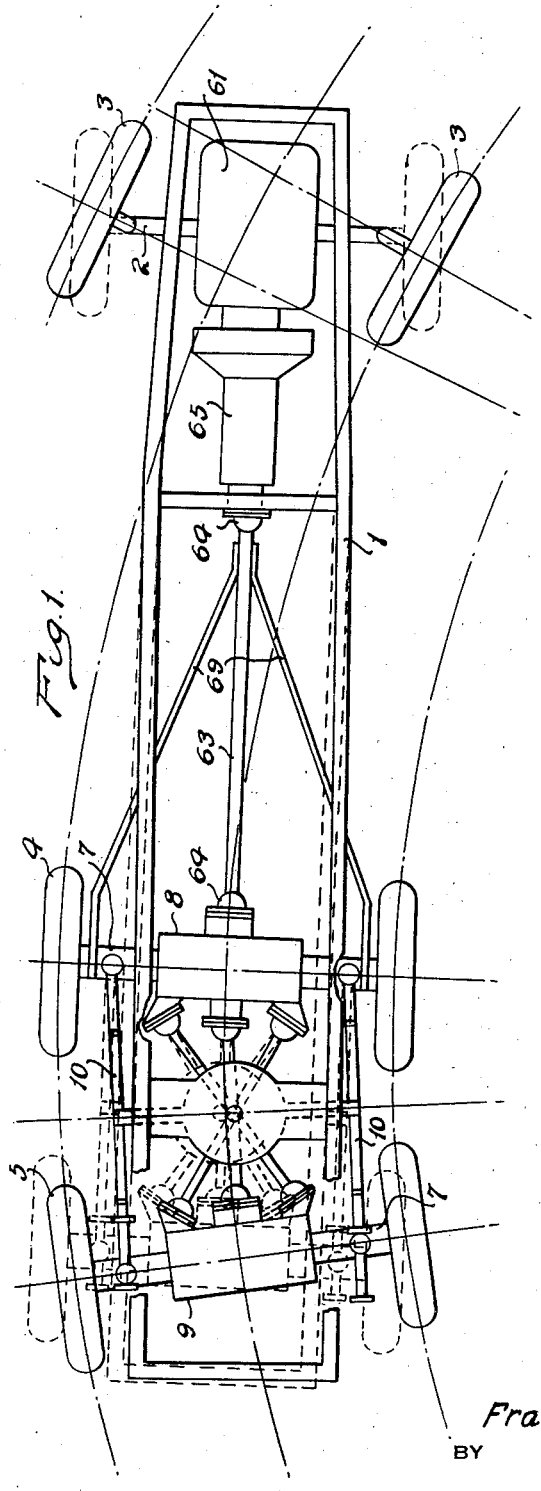
INVENTOR
*Frank L. Freeman*
BY
*J. S. Murray*
ATTORNEYS Sept. 10, 1940.  F. L. FREEMAN  2,213,981
VEHICLE DRIVE MECHANISM
Original Filed Jan. 21, 1938   5 Sheets-Sheet 2
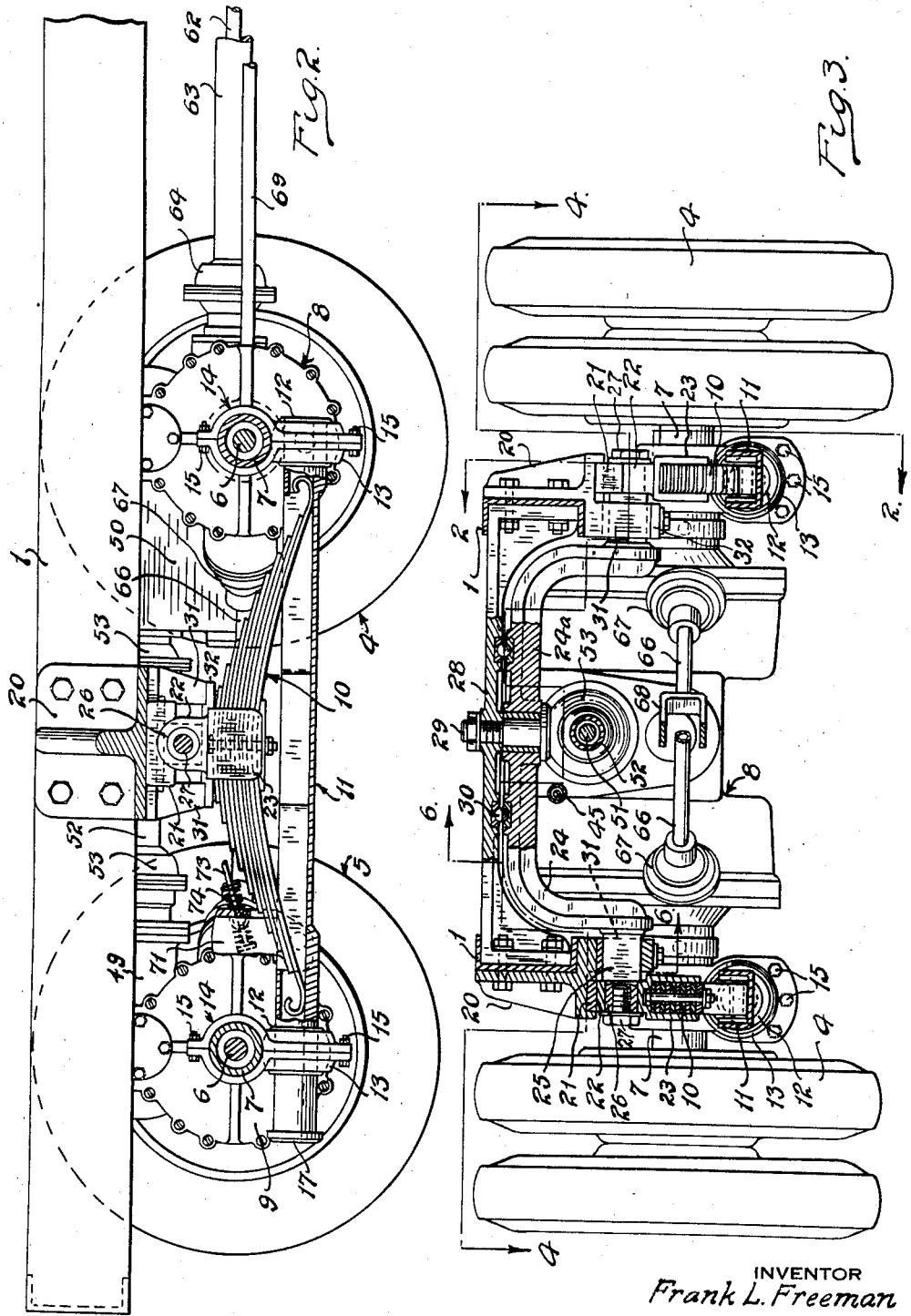
INVENTOR
Frank L. Freeman
BY
J. S. Murray
ATTORNEYS

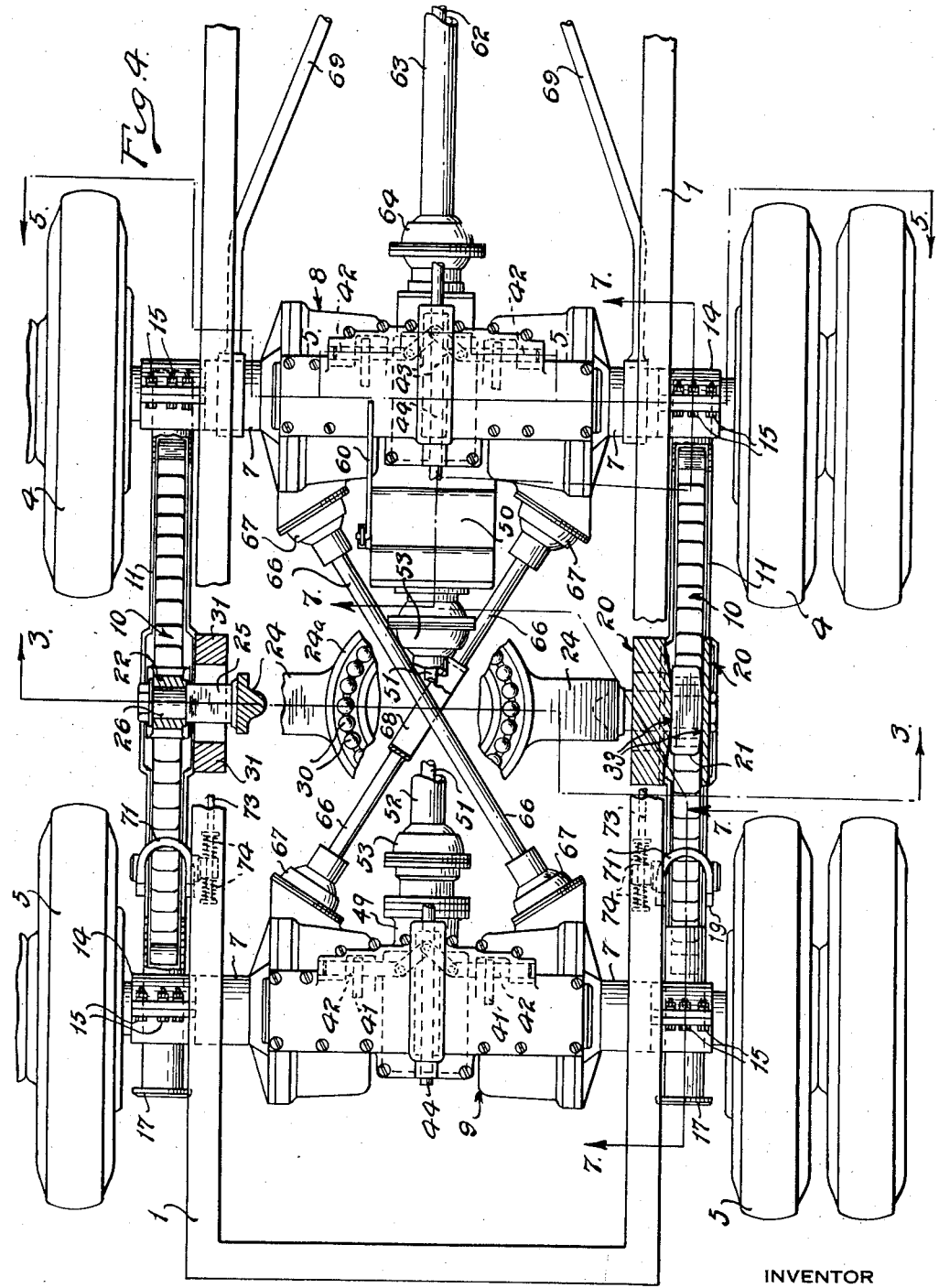

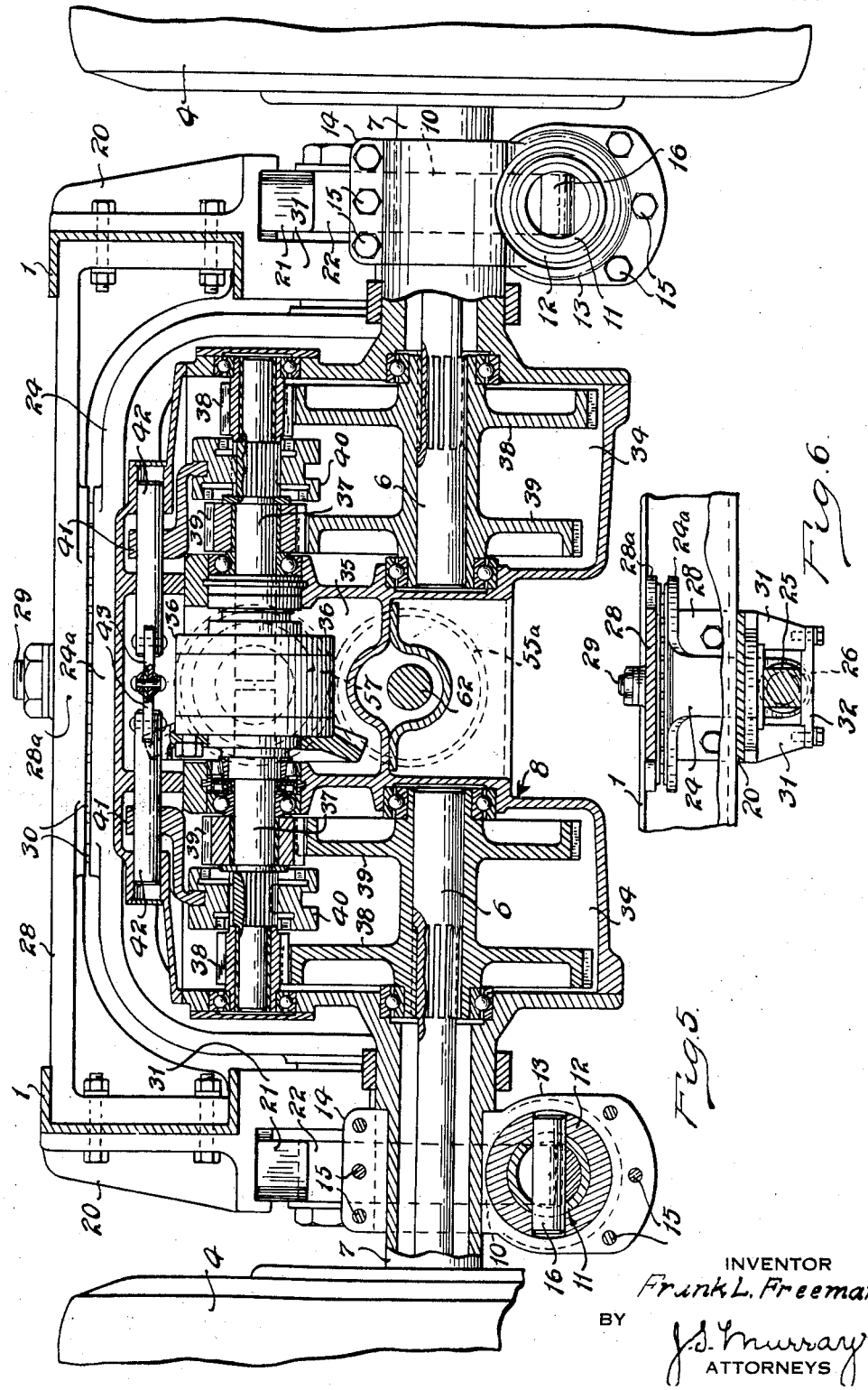

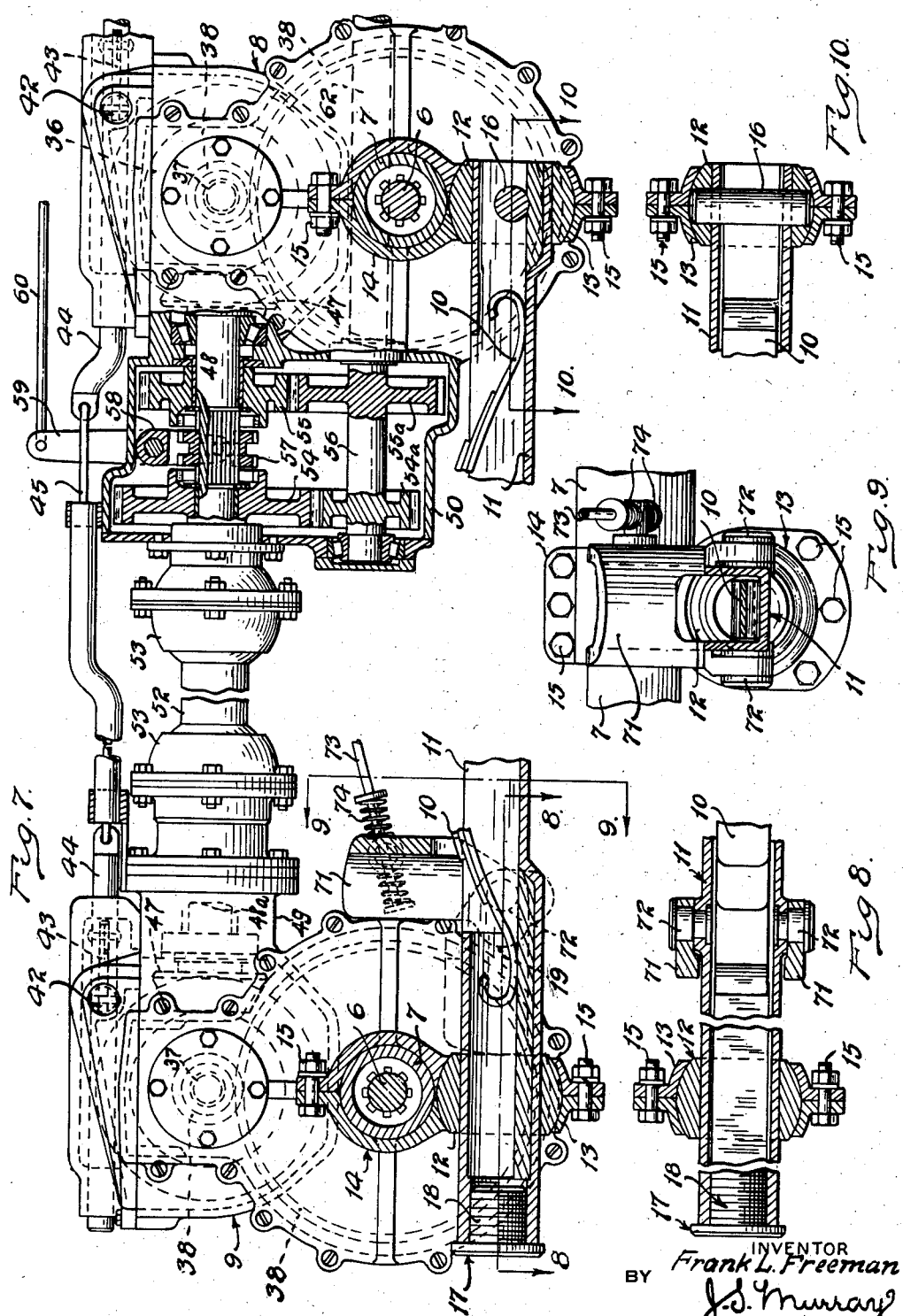

Patented Sept. 10, 1940

2,213,981

UNITED STATES PATENT OFFICE 2,213,981

VEHICLE DRIVE MECHANISM

Frank L. Freeman, Detroit, Mich.

Original application January 21, 1938, Serial No. 186,129. Divided and this application October 31, 1938, Serial No. 237,815

5 Claims. (Cl. 180—22)

This invention relates to vehicle drive mechanisms, and the present application is divisional to my application, Ser. No. 186,129, filed January 21, 1938.

An object of the invention is to provide a drive mechanism for front and rear pairs of wheels mounting the rear portion of a vehicle frame, and to transmit the drive to such wheels through an arrangement of gears adapted to more powerfully increase the transmitted torque than prior constructions.

Another object is to establish a connection for transmitting forwardly or rearwardly acting thrust from one to the other of two normally parallel axles, and to adapt such connection to adjust itself to and function in non-parallel positions which said axles may assume for steering purposes.

A further object is to transmit a drive to a pair of aligned vehicle wheels through a set of differential gears and to interpose a change-speed between the differential gears and each of said wheels.

A further object is to adapt the two change-speed gearings aforesaid to be correspondingly shifted by a single control mechanism.

A further object is to provide a unitary housing accommodating a pair of aligned axial sections, a gearing for differentially driving such sections, a pair of change-speed gearings through which the differential drive is transmitted to the axial sections, and a change-speed gearing through which a drive is transmitted to the differential gearing.

These and various other objects are attained by the construction hereinafter described and illustrated in the accompanying drawings, wherein:

Fig. 1 is a somewhat diagrammatic top plan view of the chassis of the improved vehicle, showing the positions and paths of the various wheels, in exercising a steering control.

Fig. 2 is an elevational view, partially in section on the line 2—2 of Fig. 3, showing particularly one of the bars bridged between the two driven axles to mount a leaf spring and transmit load from the same to said axles.

Fig. 3 is a cross sectional view of the chassis, taken on the line 3—3 of Fig. 4, and showing particularly the provision for mounting the frame on and transmitting its load to said bars.

Fig. 4 is a top plan view of the chassis, partially in section on the line 4—4 of Fig. 3, and illustrating the various load-transmitting and driving connections between the two driven axles.

Fig. 5 is a cross-sectional view, taken on the line 5—5 of Fig. 4, and particularly showing two change-speed gearings, and an interposed drum for housing a differential gearing driving both sets of change-speed gears.

Fig. 6 is a vertical, elevational, sectional detail of the parts forming a swivel or fifth wheel connection between the frame and its running gear, taken on the line 6—6 of Fig. 3.

Fig. 7 is an elevational view, partly in section on the line 7—7 of Fig. 4, showing particularly the relation of the two axle housings and a change-speed gearing carried by one thereof and adapted to vary the drive to both pairs of driven wheels.

Fig. 8 is a horizontal sectional detail, taken on the line 8—8 of Fig. 7 and showing features of the connection between the rear axle housing and one of the axle-bridging bars.

Fig. 9 is a cross-sectional view, taken on the line 9—9 of Fig. 7, showing one of said bridging bars in its relation to the rear axle, and also showing a latch member on said bar.

Fig. 10 is a horizontal sectional detail taken on the line 10—10 of Fig. 7, showing the mounting for the forward end of one of the axle-bridging bars.

In these views, the reference character 1 designates a motor vehicle frame carried at its front end by an axle 2, the wheels 3 of which are swiveled, as is common, for steering purposes (see Fig. 1). The rear portion of the frame is mounted on front and rear pairs of wheels 4 and 5, each having a driving axle section 6 (see Fig. 5). The outer portions of the sections 6 occupy tubular housings 7, rigidly carried by and projecting oppositely laterally from front and rear gear housings, generally designated 8 and 9.

A single pair of leaf springs 10 transmit load from the frame to the four driven wheels and are mounted to afford the rear driven wheels, together with their axle sections 6, housings 7 and the gear housing 9, a limited angular play relatively to the frame for steering purposes. Thus said springs, which are upwardly bowed between their ends, seat freely on a pair of parallel bars 11, upwardly channeled to hold the springs in place. The end portions of said bars are cylindrical and preferably tubular and lie beneath the housings 7. Each of said end portions is carried by an annular ball member 12 universally rotative in a spherical socket member 13 clamped by means of a bracket 14 on the overlying housing 7. To facilitate engagement of the brackets 14 with the housings 7 and to further facilitate assembly of the ball and socket members, each bracket is formed in two parts, each carrying half of the corresponding socket member, said parts being rigidly interconnected by bolts 15 and firmly clamped thereby on the corresponding housing 7. The forward ends of the bars 11 are pinned as indicated at 16 to the corresponding ball members 12, while the ball members 12 mounting the rear ends of said bars are free to slide on the cylindrical rear portions of said bars to afford the rear driven wheels and their axle assembly angular travel. Rearward angular movement of either end of the rear axle assembly is limited by stops 17 at the rear ends of the bars 11, such stops being preferably carried by plugs 18 screwthreaded into said ends. Forward angular movement of said assembly is limited by suitable stops 19 carried by the bars 11, hereinafter more fully described.

For transmitting load from the frame to the springs, a pair of brackets 20 are bolted or otherwise attached to the sills of the frame, and seat through saddle members 21 upon blocks 22, superposed on the mid portions of the springs, each block having a pair of depending plates 23, between which the leaves of the corresponding spring are snugly engaged.

To swivel the frame so that it may turn for steering purposes on the support established by the springs 10, the blocks 22 are connected by an arched yoke 24, having its top portion disposed between the sides of the frame, and having rectangular portions 25 beneath said sides, which portions carry cylindrical trunnions 26 fitted in correspondingly shaped openings in the blocks 22 and retained therein by the heads of bolts 27 tapped into the end faces of said trunnions. Above said yoke, a rigid connection is established between the sills of the frame by a heavy cross bar 28, which centrally rigidly carried a king bolt 29 rotatable in the yoke 24, (see Fig. 3) and preferably headed beneath the latter to maintain the same in a desired proximity to the cross bar. Also it is preferred to form the yoke and cross bar with circular enlargements 24a and 28a, centered at the bolt 29, assuring a swivel bearing of ample diameter, and anti-friction means may be interposed between said enlargements, such as the set of balls 30 illustrated (see Figs. 3 and 4). It is preferred to further interconnect said yoke to the frame by forming each bracket 20 with a pair of depending extensions 31 beneath the frame, the corresponding portion 25 of the yoke being positioned between such extensions and a plate 32 rigidly connecting such extensions being engaged beneath such portion 25. The brackets 20 thus form connections, additional to the bolt 29, between the frame and yoke 24, the paired extensions 31 being, however, spaced apart adequately to afford the frame its desired swivel movement about the bolt 29, as best appears in Fig. 4. Fig. 4 also discloses how the brackets 20 are adapted to swing with the frame, for steering purposes, about the axis established by the bolt 29, by forming certain faces 33 of said brackets and saddle members with arcuate curvatures centered at said axis.

The gear housings 8 and 9 are similar as regards their respective formation of two change-speed gear chambers 34 and a differential gearing chamber 35 between the chambers 34, and the illustration of the housing 8 in Fig. 5, showing said chambers and the gears therein, is for practical purposes, illustrative also of the gear housing 9. Referring to Fig. 5, the chamber 35 accommodates a differential gear casing or drum 36, rotatively mounted on adjoined end portions of two aligned shafts 37 and adapted to drive the latter through any suitable arrangement of differential gears (not shown), housed within said drum, as for example, the arrangement shown in U. S. Patent No. 2,070,569. The shafts 37 are upwardly spaced from the axle sections 6, and each such shaft may drive the underlying axle section through either of two meshed pairs of gears 38 and 39 occupying the corresponding chamber 34. Said gears are, of course, adapted to establish different drive ratios, selective by the shifting of clutch collars 40, one of which is splined on each shaft 37 between the two gears on such shaft. Preferably the collars 40 on the aligned shafts are controlled in common by mounting shifter yokes 41 for said collars on aligned slide rods 42, projecting into the chamber 35 and connected within the latter by links 43 to a suitable control rod 44, slidable longitudinally of the vehicle. Preferably a connection 45 between the rods 44 carried by the housings 8 and 9 adapts such rods for actuation in unison.

The drums 36 which house the front and rear differential gearings carry the usual beveled ring gears 46, driven by pinions 47 (see Figs. 5 and 7). Said pinions are fixed on shafts 48 and 48a, the axle housing 9 having a forward extension 49 journaling the shaft 48a, and the shaft 48 being journaled in the upper portion of a change-speed gear casing 50, rearwardly projecting from the mid portion of the axle housing 8.

A shaft 51, operating in a torque tube 52, establishes a drive connection between the shafts 48 and 48a, suitable universal joints 53 being provided at the junctures of said tube with the extension 49 and casing 50, and said shafts being universally joined interiorly of the joints 53.

The casing 50 houses two pairs of gears 54, 54a and 55, 55a, providing alternative drives to the shaft 48 from an underlying shaft 56 journaled in and forwardly projecting from said casing. A clutch collar 57, splined on the shaft 48 between the gears 54 and 55, is adapted in a well-known manner to establish either thereof in driving engagement with said shaft. A shifter yoke 58, suitably pivoted within the casing 50, engages the collar 57 and is actuable by a lever 59, exteriorly mounted on said casing, to establish the collar in either of its driving positions or a neutral one. A rod 60 for actuating the lever 59 extends forwardly from the latter to any desired point of control.

A motor 61, carried in any suitable manner by the front portion of the frame 1, transmits a drive to the shaft 56 through a shaft 62, mounted in the usual torque tube 63, the usual concentric universal joints 64 being provided at each end of the torque tube and shaft therein and the usual change-speed (or transmission) gearing (not shown) being housed, as indicated at 65, in rearward proximity to the engine to transmit selective speeds to the shaft 62.

To transmit thrust from the housing 9 to the housing 8, in forward travel of the vehicle and a reverse thrust in rearward travel, the two said housings are connected by a pair of heavy diagonal rods 66, occupying a freely crossed relation, whereby said rods jointly have substantially an X form, their crossing being arranged at a point substantially beneath the fifth wheel axis established by the king bolt 29. The joints 67 between said rods and the housings 8 and 9 afford a relative universal pivotal play between the rods and housings, the ends of the rods engaging each housing being located by such joints equidistantly from a plane medial to the housing ends. To permit said rods to normally occupy the same horizontal plane and also allow the described crossed relation, one of said rods comprises, at its mid portion, an open-sided box-shaped member 68, through which the other rod freely passes, the opening of the member 68 being adequate in size to afford the intended relative angular or vertical play of the rods without mutual interference.

A pair of radius rods 69, connected to the tubular end portions 7 of the axle housing 8, extend convergently forward and are welded or otherwise rigidly secured at their forward ends to the front end portion of the torque tube 63.

In rearward travel of the described vehicle, it is not feasible to exercise a steering control of relative angular play between the leading and trailing rear wheels without undue complication, and it is preferred therefore to provide for locking said wheels against any such play, at least in a horizontal plane, preliminary to rearward travel of the vehicle. Thus, pivoted upon and straddling each bar 11, is a heavy latch member 71, adapted to be swung about its pivots 72 from a non-latching, upstanding position shown in full lines in Fig. 7, to the rearwardly projecting, latching position shown in dash lines in said figure, said member having an arch form, adapting it to engage the side as well as the top of the corresponding bar 11, in said dash line position. In the latching position of the two members 71, said members terminally engage the rear ball members 12, and thus form struts resisting any forward sliding of said members 12 on the bars 11. Consequently in the latching position of the members 71, the axle housing 9 and its wheels are restrained from any angular play relative to the frame or the axle housing 8. Any suitable provision may be made for an exercise of remote control over the latch members 12. Thus, as illustrated, each of said members is engaged by a forwardly extending control rod 73, springs 74 being mounted on said rod at opposite sides of the corresponding member 12 to resist any tendency to rattle. It is preferred to form the stops 19, hereinbefore mentioned, as a pair of arcuate lugs formed on each latch member 71, at opposite sides of the corresponding bar 11, said lugs being so spaced from the stops 17, when the latch members are in their raised release positions, that the centers of ball members 12 are midway between said stops and lugs when the housing 9 is definitely transverse to the frame.

In the operation of the described invention, load is transmitted from the sills of the frame to the springs 10 through the brackets 20 and saddle members 21, without imposing load stresses on the swivel seat afforded by the yoke 24 to the cross-bar 28. The leaf springs deliver such stresses to the bars 11, whence they are transferred substantially equally to the two axle housings 8 and 9, and thence to the leading and trailing rear wheels of the vehicle.

Upon a change in the direction of travel of the vehicle, the frame 1 swivels about the king bolt 29, whereby the cross bar 28 assumes an acutely angular relation to the yoke 24 (see Fig. 1). This relative angular travel will be slight, and the spaced relation of the paired downward extensions 31 (best appearing in Figs. 2 and 4) is a sufficient provision for the entailed movement of the yoke extremities. The leading rear wheels 4 will adjust themselves to the arc of road travel prescribed by steering control of the front wheels, and the trailing rear wheels 5 will also adjust themselves to such arc, the axes of said wheels and the corresponding housings thus assuming the angular relation to the frame illustrated in Fig. 1. As said housings thus swing, the rear ball members 12 will slide freely on the cylindrical rear portions of the bars 11, and both the front and rear ball members 12, will rotate, as required, in their socket members 13. Any extreme relative angularity between the housings 8 and 9 will be prevented by engagement of the ball members 13 with the stops 17 and 19. The universally pivotal connections of the rods 66 to the axle housings allows said rods to adjust themselves to the relative angularity of such housings, while still exercising their thrust-transmitting function. The universally pivotal connections established between the housings 8 and 9 and each of the bars 11 and 66 also serve to afford necessary relative vertical play of the front and rear axle housings, or angular play in a vertical plane of one thereof. The drive shaft 51 and its torque tube 52 will accommodate themselves to relative angular travel of the housings 8 and 9, owing to employment of the universal joints 53.

Effecting a speed reduction of the transmitted drive, between the differential gearings and the driven wheels, reduces the stresses imposed on said gearings and permits use of lesser dimensions for said gearings than would be feasible if the common and more obvious practice were followed of effecting all desired speed reductions at a point or points between the motor and differential gearings.

The gears 54, 54a, and 55, 55a provide for two selective variations of driving speed and the gears 38 and 39 afford two additional variations. Thus if within the usual change-speed gear casing 65, there is made the usual provision for three changes of speed in forward travel, the total number of differently geared forward drives available will be twelve, thus permitting the vehicle to be very closely adapted to different driving and load conditions. Furthermore, the provision of the several described successively acting speed-reducing gearings will permit of a much greater application of tractive force when the aggregate reduction is a maximum, than has been heretofore afforded in vehicles serving a similar purpose, the available traction being further increased through application of a drive to both the leading and trailing rear wheels.

The weight added to that of the vehicle by the gears 38 and 39 and their casings tends materially to lower the center of gravity of the vehicle, as a whole, and consequently increases stability as compared to prior practice.

The construction provides for a substantially equal distribution of load to the two rear axles, while affording such free relative vertical play of said axles or relative angular play thereof in a vertical direction, as may be entailed by projections of depressions in any surface traversed by the vehicle.

The invention is presented as including all such modifications and changes as come within the scope of the following claims.

What I claim is:

1. In a vehicle, the combination with an elongated frame and two axle housings spaced longitudinally of and supporting the frame, of a pair of aligned live axle sections journaled in each of said housings, a pair of wheels driven by each pair of axle sections, a pair of aligned shafts mounted in each axle housing parallel to said axle sections, means in each axle housing for driving the respective axle sections from the respective shafts at selective speeds, a differential gearing in each axle housing for driving said aligned shafts in such housing, a common drive means for the differential gearings in both housings, including a speed-selective gearing carried by one of said housings, and a selective control for said gearing, independent of the first-mentioned means for effecting speed selection, and a common means for effecting speed selection within both axle housings.

2. In a vehicle, the combination with an elongated frame, of a pair of axle housings spaced longitudinally of and carrying such frame, a pair of aligned live axle sections ujornaled in each housing, a pair of aligned shafts journaled in each housing approximately above said axle sections, drive connections from the respective shafts to the respective axle sections, a differential gearing associated with and driving each pair of aligned shafts, two shafts extending longitudinally of the vehicle and journaled one in each housing for driving the differential gearings, a shaft forming a drive connection from one to the other of said drive shafts for the differential gearings, a main drive shaft mounted on one of said housings substantially beneath and parallel with the differential gearing drive shaft journaled on such housing, and means establishing a drive at selective speeds from the main drive shaft to the overlying shaft.

3. In a vehicle drive mechanism, the combination with an elongated frame, and two axles supporting the frame and spaced lengthwise thereof, and relatively angularly movable in a substantially horizontal plane, each axle comprising two substantially aligned axle sections, drive gearing for said sections and a housing for such gearing, of a common means for driving the gearings of both axles, and a pair of freely crossed thrust rods universally connected at their ends directly to the housings of the two axles, whereby said axles may freely conform themselves to angular movement of the frame incident to a steering control of the vehicle.

4. In a vehicle drive mechanism, the combination with spaced front and rear axle housings, of a pair of substantially aligned axle sections journaled in each housing, a differential gearing in each housing for driving the corresponding axle sections, a drive connection between the two differential gearings, universally mounted on said housings, and freely crossed thrust connections between the two housings, universally engaged with the housings and disposed beneath said drive connection, and affording the axles a relative angularity to freely conform to a steering control of the vehicle.

5. In a vehicle, the combination with two axle housings spaced longitudinally of the vehicle, a pair of aligned live axle sections journaled in each housing, a differential gearing in each axle housing, means for driving the differential gearings in common, corresponding change-speed drive gearings in each housing affording selective drive to each axle section in said housing from the differential gearing in said housing, and a common means for selecting a like drive to the axle sections of both housings.

FRANK L. FREEMAN.